J. RUPPENTHAL.
Hose-Coupling.

No. 163,261. Patented May 11, 1875.

ATTEST:
Robert Burns.
Henry Tanner.

INVENTOR:
Jacob Ruppenthal
By Knight Bros
Attys.

UNITED STATES PATENT OFFICE.

JACOB RUPPENTHAL, OF ST. LOUIS, MISSOURI.

IMPROVEMENT IN HOSE-COUPLINGS.

Specification forming part of Letters Patent No. 163,261, dated May 11, 1875; application filed March 26, 1875.

*To all whom it may concern:*

Be it known that I, JACOB RUPPENTHAL, of St. Louis, St. Louis county, Missouri, have invented a certain Improved Hose-Coupling, of which the following is a specification:

In this invention the necks of the coupling are formed with a swell, from which they taper in both directions, and are circularly fluted, so as to better hold the hose ends in which they are inserted. Outside the hose ends are two conical sleeves, one of which screws into the other and clamps the hose against the tapering sides of the swell on the coupling-necks. The inner one of the sleeves is prevented turning on the coupling-neck by a lug or feather formed thereon, which enters a notch formed in the flange of said sleeve.

Figure 1:
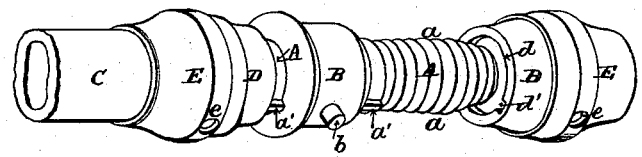
Figure 2:
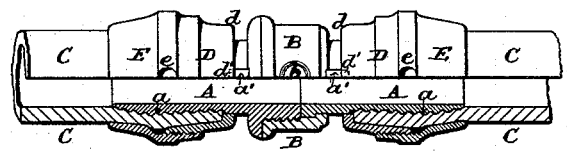

In the drawings, Figure 1 is a perspective view, showing parts detached. Fig. 2 is a view half in elevation and half in axial section.

A A are the coupling-necks, united together, as usual, by an ordinary "union-coupling," B, having spanner-lug $b$ for turning, as usual. The necks are formed with a swell, $a$, at or near the center, and taper or incline in both directions, as shown, and the outer surfaces of the necks are circularly fluted, to give a better hold on the hose C. D is a conical or tapering sleeve, arranged outside the neck A, and over the hose end C, and having an inturned flange, $d$, provided with a slot, $d'$, to fit over the lug or feather $a'$ of the neck, by which the sleeve D is prevented turning on the neck A when screwing into it the screw-sleeve E, the feather allowing the sleeve D to move endwise upon the neck and hose end, but preventing its rotation. E is a similar conical sleeve, which screws onto the sleeve D, and draws the two sleeves D E together, so that their inclined inner surfaces will firmly clamp the hose against the inclined sides of the swell $a$. $e$ is a hole in which a spanner engages to turn the sleeve. The sleeve-nut of the union-coupling B has its flange notched, to allow this nut to be slipped into place upon the neck A, past the lug $a'$.

In securing the hose to the coupling the sleeve D is placed on the neck A, and the sleeve E is placed over the hose end C; the hose is then pushed over the neck A and under the sleeve D; then, by screwing the sleeve E onto the sleeve D, said sleeves approach each other, and firmly clamp the hose against the inclined sides of the swell $a$.

In this coupling it will be seen that the neck A of the coupling is formed without any screw-threads on it, so that in case it be bent or indented by a wagon running over it it can be again straightened by driving a mandrel into it, making it as good as new.

In other couplings of this class the neck is screw-threaded, and when bruised or indented is rendered worthless, as the neck cannot be again made sufficiently true to take a nut, and, consequently, the whole coupling is destroyed, while with my coupling, in such a contingency, only the screw-sleeves D E are ruined.

I claim as my invention—

1. The swelled and fluted neck A, in combination with the tapering sleeves D E, arranged to screw together, as and for the purpose set forth.

2. The swelled and fluted neck A, having lug $a'$, in combination with tapering sleeves D E, as and for the purpose set forth.

JACOB RUPPENTHAL.

Witnesses:
 SAML. KNIGHT,
 ROBT. BURNS.